United States Patent [19]

Burns

[11] 4,018,244
[45] Apr. 19, 1977

[54] AUTOMATIC SWITCHOVER VALVE AND SYSTEM UTILIZING SAME

[75] Inventor: James A. Burns, Lake Elmo, Minn.

[73] Assignee: Airco, Inc., Montvale, N.J.

[22] Filed: Sept. 10, 1975

[21] Appl. No.: 612,136

[52] U.S. Cl. .............................. 137/113; 137/102
[51] Int. Cl.² .................. F16K 11/07; G05D 11/00
[58] Field of Search ............ 137/106, 112, 113, 102

[56] References Cited

UNITED STATES PATENTS

| 2,300,694 | 11/1942 | Overbeke | 137/113 |
| 2,440,478 | 4/1948 | Kehle | 137/113 |
| 2,641,273 | 6/1953 | Siebens | 137/113 |
| 3,628,556 | 12/1971 | Bachman | 137/106 |
| 3,633,606 | 1/1972 | Hay et al. | 137/113 |

FOREIGN PATENTS OR APPLICATIONS

| 1,490,561 | 6/1967 | France | 137/113 |
| 970,307 | 9/1964 | United Kingdom | 137/113 |

*Primary Examiner*—William R. Cline
*Attorney, Agent, or Firm*—Roger M. Rathbun; Edmund W. Bopp; H. Hume Mathews

[57] ABSTRACT

An automatic switchover valve is described having a unique venting system whereby any areas which may cause a buildup in pressure during shuttling are normally vented to atmosphere. The shuttle is of a simple, easy to manufacture design having a central inwardly tapered portion which allows communication with internal parts of the valve to atmosphere. The valve also features sealing means which seal against moving surfaces without being subjected to rubbing on sharp surfaces or orifices, thus prolonging seal life.

6 Claims, 2 Drawing Figures

AUTOMATIC SWITCHOVER VALVE AND SYSTEM UTILIZING SAME

BACKGROUND OF INVENTION

This invention relates to an automatic switchover valve commonly used for switching from a bank of gas supply cylinders which has had its pressure depleted below a predetermined pressure to a fresh bank at full pressure for supplying the gas to an end use.

Such valves are automatic and many operate on a known principle where the switching occurs because of a sensed differential in pressure between the full pressure cylinder bank and the depleted cylinder bank. A typical valve of this type is shown and described in British Patent No. 970,307, where the "shuttle" has two areas at each end thereof, a smaller area which enters into the inlet valve openings and a larger area within the valve housing. The pressure on the "in use" side of the valve acts upon the larger or full area of the shuttle to maintain the valve in that position. As this pressure is reduced due to depletion of the gas, a point is reached where the high pressure on the full cylinder side of the valve, acting upon only the smaller end area of the shuttle, forces the shuttle toward closing the in-use side. The movement of the shuttle begins fairly moderately until the smaller area is withdrawn from the full cylinder inlet opening, at which time, the full pressure then acts upon the full end area of the shuttle and it is rapidly propelled to close the in-use inlet and open the full cylinder inlet to supply gas from that full supply pressure to an outlet in the valve.

By use of the two area concept, the depleted gas cylinder can be replaced by a full cylinder, which then acts only upon a smaller, reduced area than the area upon which the in-use pressure acts. Thus, the valve will not shuttle when the new tanks are installed, but only when the in-use tanks are depleted to the predetermined pressure, i.e. the predetermined pressure differential again exists.

One difficulty with this type of valve is the possible build-up of pressure in closed or trapped areas within the valve when the shuttle moves toward the depleted side. One method used to avoid the problem of pressure build-up is to provide a venting of any such areas to the depleted gas cylinders as described in U.S. Pat. No. 3,633,606.

A further difficulty is in providing adequate sealing for the shuttle, that is, for both the smaller area end portion and the larger area end portion of the shuttle. Both areas must be sealed around their periphery against internal valve surfaces to prevent leakage which may also cause a premature shuttle. The seals in present valves can easily wear through the fast shuttling action or by the introduction into the valve of minute particles of dirt or other foreign material. The wearing can be particularly a problem where seals are embrittled by cold weather, when used outdoors, or where piping gases which cause a refrigerant effect such as nitrous oxide. The cold, hardened seals are easily harmed by sliding against sharp edges or orifices in the shuttle.

Other difficulties include alignment or switching and may employ springs or other mechanical means to assist in the shuttling. Such remedies are, however, costly, difficult to manufacture, and lose their preciseness through a change in the spring constants through wear or even possible spring breakage.

SUMMARY OF INVENTION

The switchover valve of the present invention overcomes the aforementioned difficulties in prior art valves by providing an extremely simple, easily manufactured design which requires no additional springs or the like for actuation. The valve operates on the two area principle, yet there is not confined or trapped area for pressure to build up at either side of the valve when shuttling takes place, inasmuch as there is an automatic venting to atmosphere of any potential trapped areas and thus no confined area in which pressure can build up.

In addition, all seals are so positioned that they are prevented from sliding against orifices or sharp edges of the shuttle.

The valve includes two inlets and two outlets with a unique venting means which is accomplished by tapering the center of the shuttle itself and providing an opening to atmosphere which communicates with the interior of the valve at the tapered portion of the shuttle.

BRIEF DESCRIPTION OF DRAWINGS

The invention may best be understood from the following detailed description of a preferred embodiment of the same, when considered with the annexed drawings, wherein.

DESCRIPTION OF PREFERRED EMBODIMENT

Figure 1:
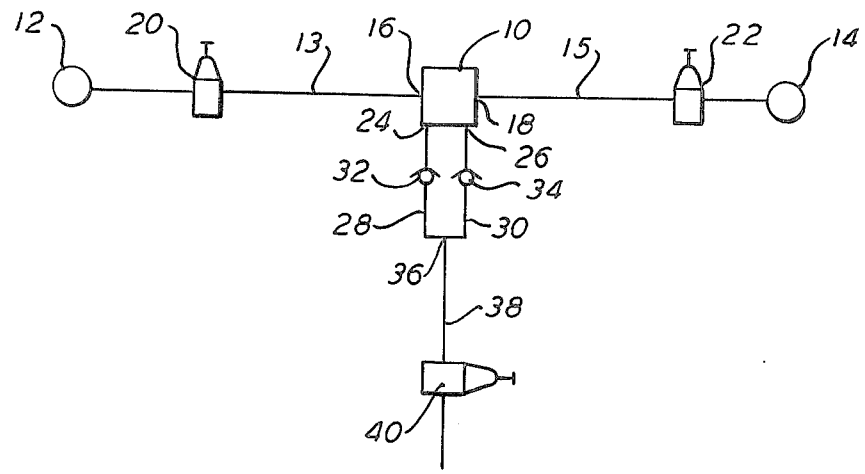
FIG. 1 is a schematic flow diagram showing a typical system arrangement utilizing the switchover valve of the present invention.

In FIG. 1, there is shown a schematic flow diagram showing a typical use of the switchover valve 10 of the present invention. Separate first and second banks of cylinders, respectively, 12 and 14, are shown, and which each may comprise multiple cylinders of gas which are joined to a common manifold. Each bank of cylinders lead, respectively, via gas conduits 13 and 15, to separate inlets, such as first and second inlets 16 and 18 of switchover valve 10. Suitable regulators 20 and 22 are located intermediate each of the cylinder banks 12 and 14 and the respective first and second inlets 16 and 18. Typical pressures in the cylinder banks 12 and 14, for oxygen, are about 2,400 psi. This invention will be further described in terms of pressure, as specifically applying to an oxygen supply for a hospital; however, it will be obvious that the invention may be used with almost any gas.

The regulators 20 and 22 typically reduce the gas pressure to about 230 psi for introduction into switchover valve 10.

First and second outlets, respectively 24 and 25, are provided in the valve 10 which communicates with fluid conduits 28 and 30 having check valves 32 and 34 therein. The check valves 32 and 34 are disposed to prevent communication of the in-use bank of gas with the vent 82 to atmosphere — which vent will be mentioned further hereinbelow.

The fluid conduits 28 and 30 are joined by a common manifold 36 downstream of the check valves 32 and 34, and a further gas conduit 38 is used to carry the gas from manifold 36. A regulator 40 in conduit 38 further reduces the gas pressure for the desired end use of the gas. Since FIG. 1 is schematic, the regulator 40 may, of course, comprise a plurality of individual regulators distributed through the hospital and which may individually be adjusted for the desired end pressure needed for the gas.

Figure 2:
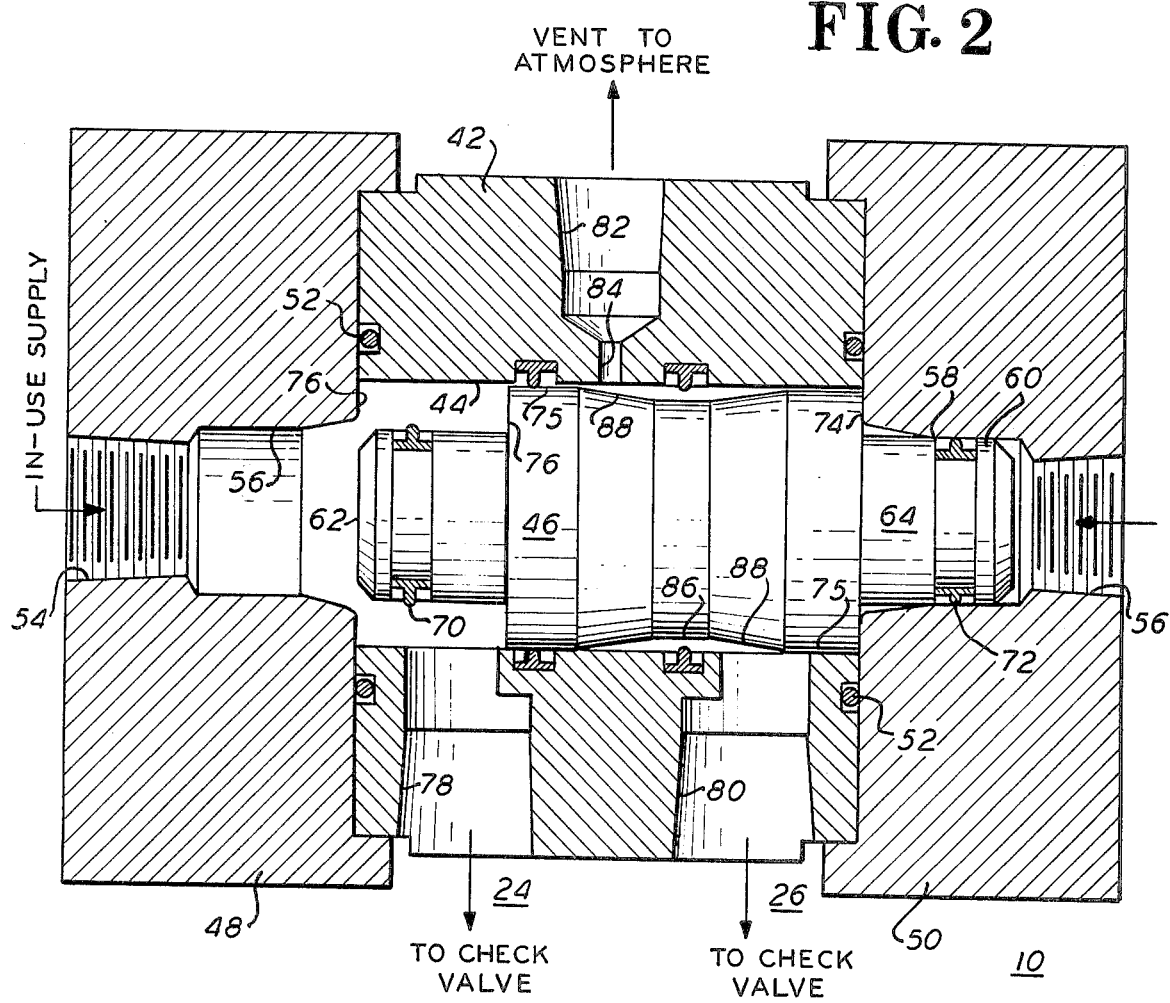
FIG. 2 is a cross-sectional view of the switchover valve constructed in accordance with the present invention.

Turning now to FIG. 2, a cross-sectional view of the switchover valve 10 is shown, having a central casing 42 having a bore 44 with a shuttle 46 slideable therein. A pair of end caps 48 and 50 are sealed to each end of the central casing 42 by sealing means such as O-rings 52. Each end cap has a suitable inlet bore 54 and 56 which comprise first and second inlets 16 and 18 of valve 10. The bores 54 and 56 are provided with suitable means for gas tight connection to inlet conduits 13 and 15. The end caps 48 and 50 also each have first and second shuttle receiving bores 56 and 58 which receive the first and second reduced area ends 60 and 62 of the shuttle 46. Suitable sealing means, such as T-seals 70 and 72 seal the periphery of the reduced diameter ends 66 and 68 when positioned within their respective shuttle receiving bores 56 and 58. The T-seals, a product of Parker Rockwell, are advantageous in the presently depicted embodiment in that they are found to be well restrained in their seating grooves at the pressures of interest. Depending on the geometry of the sealing surfaces, however, other sealing means such as conventional O-rings, may be effectively employed.

As shown in FIG. 2, when the shuttle 46 is in the position to the right, a shoulder 74 abuts against the end cap 50, thus preventing further movement of the shuttle 46 in that direction. In similar fashion, a shoulder 76 provides a stop for travel to the left when the shuttle 46 moves in that direction.

First and second outlets 24 and 26 are formed by, respectively, first and second outlet bores 78 and 80 in the central casing 44 transverse to the movement of the shuttle 46 and coaxially located thereto. Again, the bores 78 and 80 are suitably formed with means to conveniently connect each with conduits 28 and 30.

A vent to atmosphere is also provided in central casing 42 and comprises a vent bore 82 having a small restrictor 84 which communicates with the interior of shuttle bore 44.

The shuttle 46 has its center tapered, as shown, symmetrically from its outside diameter 75 which fits within shuttle bore 44 to a smaller outside diameter, shown at 86 at its center. The inwardly tapered portions 88 provide a smooth continuous surface of shuttle 46. Sealing means (such as T-seals) are provided to seal, at two laterally disposed locations with respect to the vent bore 82, against the outside diameter 75 of shuttle 46 against the inside of shuttle bore 44.

In order to explain the operation of the shuttle valve, it is assumed that the first bank of cylinder 12 is currently in use so that the gas is flowing into inlet 16, through the valve 10 and out through outlet 24. As shown in FIG. 2, in this condition the shuttle 46 is in the right position. As the pressure in the cylinder 12 is depleted, the force of that pressure against the large area, (i.e. both the area of the reduced area end 62 and shoulder 76) becomes decreased to the point where it is overcome by the force acting upon the reduced area end 64 which is acted upon by full pressure from the second bank of cylinder 14. At that point, the shuttle 46 moves to the left moderately until the sealing means 70 seals against the interior of shuttle receiving bore 56, and the seal means 72 unseals itself from the shuttle receiving bore 58.

The full pressure from cylinder 14 then acts upon the large area of shuttle 96, i.e. the reduced area end 64 and the shoulder 74, while the now reduced pressure from depleted cylinders 12 act only upon the reduced area end 62, thus the shuttle is rapidly propelled to the furthermost left position until the shoulder 76 is stopped by abutting the end cap 48. This movement, of course, opens second inlet 18 through the valve 10 to the second outlet 26 and gas moves through that path to the hospital uses. The explanation so far is similar to other reduced area shuttle valves in its principle of operation, except that separate outlets are used, respectively, for separate inlets.

In the present invention, however, the smaller outside diameter 86 at the center of the shuttle 46 allows a communication between the outlet which is not in use, directly to the atmosphere via vent bore 82. As shown in FIG. 2, outlet 24 is in use supplying gas to the end use, while at the same time the outlet 26 is vented to atmosphere past the center of shuttle 46 to vent bore 82. As may also be seen, there is no confined space caused by movement of the shuttle in either direction where a build-up of pressure can occur. Any gas trapped in either end as the shuttle 46 moves toward that end, i.e. between the shoulders 74, 76 and either of the tapered portions 58, 66, 68 sealed by T-seals 70 and 72 can easily leak past the outside diameter 75 of shuttle 46 to the smaller diameter center 86 and then to atmosphere via vent bore 82. Thus either end toward which the shuttle 46 moves is vented to the centrally located vent bore 82 and there is no confined area in which pressure can build up to cause a premature shuttling of the valve. Also, this construction prevents premature shuttle in the event either of the sealing means 70 and 72 tend to leak. Again referring to FIG. 2, a small leak which occurs across sealing means 72 cannot act to shuttle the valve to the left prematurely inasmuch as any pressure leaked by sealing means 72 is vented along the shuttle 46 to atmosphere via vent bore 82. Thus it is insured that the pressure in the bank which acts upon the closed end of valve 10 can effectively act only upon a reduced area end only.

Further, this valve construction allows any surface which moves past a sealing means, as shown, T-seals, to be flat or tapered surfaces, and never any sharp surfaces or orifices which might damage the seal, thus the maximum seal life is maintained. Also, any foreign particles which might accumulate on the seal can be removed by the wiping action and not forced into the seals to cause damage and resultant leakage.

Finally, it is re-emphasized that the various sealing means employed in the embodiment of FIG. 2 may be replaced by equivalent elements appropriate to slightly altered geometries. For example, the T-seals 70 and 72, while preferable for the geometry shown, can in general be replaced by O-ring seals. O-rings may indeed be equal or more effective than T-seals in certain arrangements, e.g. if the geometry is altered so that the O-rings are carried in recesses formed at the valve housing with the opposite end portions 62 and 64 of shuttle 46 merely carrying surfaces for sealing the said O-rings, as the shuttle moves to one of its end positions. Similarly, while in FIG. 2 the pair of gas inlets are at right angles to the outlets with which they are respectively paired, such inlets may be oriented in parallel fashion with respect to their paired outlets, provided of course that the said inlets pass to the appropriate interior portion of the valve housing, as to enable closing of the gas flow path between the inlet and paired outlet by movement of the shuttle 46 to one of its two end positions.

Accordingly, while the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:
1. An automatic switchover valve for changing from a relatively depleted to a fully pressurized gas supply, comprising:
   a valve housing having a bore extending between opposed ends thereof, first and second inlets at opposite ends of said bore for connection to alternate gas supply sources, and first and second outlets extending transverse to said bore intermediate said inlets for providing said gas to a utilization point;
   a shuttle body moveable in said bore by the differential pressure of said alternate supplies between a first position whereat said first inlet is placed in communication with said first outlet, and a second position whereat said second inlet is placed in communication with said second outlet;
   first sealing means acting at said first inlet when said shuttle body is in said second position for sealing said first inlet from said bore;
   second sealing means acting at said second inlet when said shuttle body is in said first position for sealing said second inlet from said bore;
   a venting outlet being formed through said housing between said first and second outlets;
   third sealing means acting at said bore intermediate said venting outlet and said first inlet and outlet when said body is in said first position for sealing said first inlet and outlet from said venting outlet and said second outlet;
   fourth sealing means acting at said bore intermediate said venting outlet and said second inlet and outlet when said body is in said second position for sealing said second inlet and second outlet from said venting outlet and said first outlet; and
   said shuttle body being tapered inwardly toward the center thereof to interconnect the venting space defined in said bore between said second and third sealing means with said venting outlet when said shuttle body is in said first position, and to interconnect the venting space defined in said bore between said first and fourth sealing means with said venting outlet when said shuttle body is in said second position.

2. A device in accordance with claim 1, wherein said shuttle body includes shoulder portions to alternate sides of said tapered portion, one of said shoulder portions cooperating with one of said third and fourth sealing means when said body is in said first or second positions, and the inwardly tapered portion being disposed in opposition to and spaced from said alternate of said third or fourth sealing means to at least partially define said venting space.

3. An automatic switchover valve for changing from a relatively depelted to a fully pressurized gas supply, comprising:
   a valve housing including a continuous bore and first and second inlet/outlet pairs disposed toward opposed ends of said bore;
   a shuttle body moveable in said bore between first and second positions, where at each said position one of said pairs is open for gas flow, and the other said pair is closed to gas flow by sealing effected between said body and the inlet member of said pair;
   sealing means in said bore sealing with said shuttle body at each of said first and second positions for isolating the inlet-outlet pair open to gas flow from the portion of said housing communicating with the inlet/outlet pair closed to gas flow;
   a venting outlet being formed through said housing and transversely intersecting said bore intermediate said inlet/outlet pairs; and
   said shuttle body being configured to define with said housing at either said first or second positions, a venting space communicating with said venting outlet and including at least the said portions of said housing between said venting outlet and said closed inlet.

4. A device in accordance with said claim 3, wherein said shuttle body includes toward opposite ends thereof, surfaces for sealing closed the said inlet member of a said inlet/outlet pair; said body further, having an inwardly tapered central portion adjoined on opposite sides by shoulder portions adapted for engaging with the said sealing means isolating said open inlet/outlet pair, and said venting space including the portions of said valve housing intermediate the shoulder portion engaging said sealing means and the said surface sealing closed the said inlet member.

5. A device in accordance with claim 4, wherein said outlet member of the inlet/outlet pair closed comprises part of said venting space.

6. An automatic switchover valve for changing from a relatively depleted to a fully pressurized gas supply, comprising:
   a valve housing having a continuous bore extending therethrough;
   a venting outlet transversely intersecting said bore toward the mid-point thereof;
   a first inlet for a first gas supply, and a first outlet, being disposed at one side of said venting intersection;
   a second inlet for said alternate gas supply, and a second outlet, being disposed at the side of said venting intersection opposite said first inlet and outlet; and
   a shuttle body including a plurality of sealing surfaces being disposed in said bore and moveable by the pressure differential of said alternate supplies between first and second positions; first and second of said sealing surfaces respectively coacting with said bore at said inlets for alternately sealing said first or second inlets in accordance with said body position; a further of said body sealing surfaces engaging and sealing with said bore at one side of said venting outlet in either said first or second body position, for isolating the inlet and outlet at the end of said bore opposite said closed inlet from said venting outlet and from the portions of said housing residing between said area of said further sealing surface engagement and the end of the said bore having said closed inlet; and the central portion of said shuttle body being tapered towards its axis, said tapered portion being disposed opposite said venting outlet in either said first or second position, to enable venting of said housing portions residing between said engaged further sealing surface and said closed inlet.

* * * * *